United States Patent [19]
McKenna

[11] Patent Number: 6,027,818
[45] Date of Patent: Feb. 22, 2000

[54] THERMOPLASTIC COPOLYESTER COMPOSITIONS MODIFIED WITH EPOXIDE COMPOUNDS

[75] Inventor: James Michael McKenna, Hockessin, Del.

[73] Assignee: E. I. du Pont de Nemours and Company, Wilmington, Del.

[21] Appl. No.: 09/330,268

[22] Filed: Jun. 11, 1999

Related U.S. Application Data

[60] Provisional application No. 60/093,422, Jul. 20, 1998.
[51] Int. Cl.⁷ .............................. B32B 27/10; C08F 20/00
[52] U.S. Cl. .......................... 428/481; 528/275; 528/286; 528/300; 528/301; 528/302; 528/308; 528/308.6; 525/437; 525/438; 428/480
[58] Field of Search ..................................... 528/275, 286, 528/300, 301, 302, 308, 308.6; 525/437, 438; 428/480, 481

[56] References Cited

U.S. PATENT DOCUMENTS

| | | | |
|---|---|---|---|
| 3,723,568 | 3/1973 | Hoeschele | 525/438 |
| 3,723,569 | 3/1973 | Hoeschele | 525/438 |
| 5,541,258 | 7/1996 | Aonuma et al. | 525/166 |

*Primary Examiner*—Sam Acquah
*Attorney, Agent, or Firm*—William H. Hamby

[57] ABSTRACT

Copolyether ester elastomers are provided which contain epoxide compounds. The compositions show improved bloom resistance in the presence of diamines with minimum increase in melt viscosity. Also disclosed are methods to improve appearance and eliminate bloom from finished products comprising thermoplastic copolyesters by lowering the level of acid terminated oligomers in the thermoplastic copolyesters with epoxide compounds.

14 Claims, No Drawings

THERMOPLASTIC COPOLYESTER COMPOSITIONS MODIFIED WITH EPOXIDE COMPOUNDS

This application claims the benefit of U.S. Provisional Application No. 60/093,422 filed Jul. 20, 1998.

FIELD OF THE INVENTION

The present invention relates to a product showing improved bloom resistance obtained from copolyether ester elastomers and to the copolyether ester compositions required therefor.

BACKGROUND OF THE INVENTION

Copolyether ester elastomers are commonly used for molded parts inside automobiles. It has been found that in many cases, some molded parts have the tendency to "bloom." This surface bloom is undesirable since it can affect the color and gloss of the finished parts. It can also make surface scratches much more visible. This bloom is believed to be a migration of some of the ingredients in the copolyether ester elastomer to the surface, and once there will form a light colored haze.

Analysis on the bloom shows the presence of different diamines, including those that promote the formation of polyurethane such as triethylenetriamine, DABCO (triethylene diamine), N,N-diethylcyclohexylamine, N,N-dimethyloctylamine; 1,5-diazabicyclo[4.3.0]non-5-ene (DBN); N,N,N',N'tetramethyl hexamethylene diamine, and N,N,N',N'tetramethyl bis (2-aminoethyl) ether. Such diamines are usually found in components of the polyurethane foam commonly used in the interior of automobiles.

It is believed that these diamines evaporate out of the polyurethane foam present in the air inside automobiles. It is also believed that in the presence of these diamines, acid-terminated oligomers can migrate to the surface of the copolyether ester elastomers, forming insoluble salts.

A need exists for copolyether ester elastomer compositions which are bloom-resistant when exposed to air containing amines, preferably, without an increase in melt viscosity.

SUMMARY OF THE INVENTION

Accordingly, there is provided a novel copolyether ester elastomer composition that has outstanding resistance to bloom when exposed to air containing amines, said composition comprising:
  a) a copolyether ester composed of hard segments derived from at least one alkylene diol and at least one aromatic dicarboxylic acid, and soft segments derived from at least one polyalkylene oxide glycol and at least one aromatic dicarboxylic acid;
  b) a compound comprising at least one epoxide group in an amount sufficient for said epoxide compound to react with carboxylic acid end groups to obtain a reduction in acidity of at least 20%; and
  c) 0–1 weight percent of a catalyst selected from the group consisting of phosphonium compounds, alkali metal salts and alkaline earth metal salts.

Also provided is a method for reducing bloom appearance in copolyether ester elastomer composition exposed to amine-containing air.

DETAILED DESCRIPTION OF THE PREFERRED EMBODIMENTS

The novel copolyetherester elastomer compositions of the present invention have incorporated therein effective amounts of an epoxide compound, and optionally a catalyst. This combination of additives surprisingly resulted in a copolyetherester composition that substantially retains its melt flow characteristics, is stable and nonblooming. It is found that the epoxide additive reacts with the carboxylic acid end groups on the copolyether elastomer and the acid-terminated oligomers.

Thermoplastic Copolyetherester Elastomers

The thermoplastic copolyetherester elastomers useful in this invention are defined below. The term "thermoplastic copolyetherester elastomer" as used herein means a segmented polymer comprising about 25% to about 90% by weight of recurring linear etherester (soft) segments derived from difunctional polyether glycol and dicarboxylic acid, and about 10% to about 75% by weight of recurring linear ester (hard) segments derived from low molecular weight organic diol and aromatic dicarboxylic acid. Preferred copolyetheresters contain 30–75 wt. % short-chain ester units (hard segments) and 25–70 wt. % long-chain ester units (soft segments).

The glycols in the soft segments are long-chain polymeric glycols having terminal (or as nearly terminal as possible) hydroxy groups and a number average molecular weight from about 400–4000. The glycols used to prepare the copolyetheresters are poly(alkylene oxide)glycols having a carbon-to-oxygen atomic ratio of about 2.0–4.3. Representative long-chain glycols are poly(ethylene oxide) glycol, poly(1,2- and 1,3-propylene oxide)glycols, poly(tetramethylene oxide)glycol, random or block copolymers of ethylene oxide and 1,2-propylene oxide, and random or block copolymers of tetrahydrofuran with minor amounts of a second monomer such as ethylene oxide.

The term "dicarboxylic acids" as used herein, includes equivalents of dicarboxylic acids having two functional carboxyl groups which perform substantially like dicarboxylic acids in reaction with glycols and diols in forming copolyetherester polymers. These equivalents include esters and ester-forming derivatives, such as acid anhydrides. The molecular weight requirement pertains to the acid and not to its equivalent ester or ester-forming derivative. Among the aromatic dicarboxylic acids for preparing the copolyetherester polymers, those with 8–16 carbon atoms are preferred, particularly the phenylene dicarboxylic acids, i.e., phthalic, terephthalic and isophthalic acids and their dimethyl esters.

The "low molecular weight diols" in the hard segments include equivalent ester-forming derivatives, provided, however, that the molecular weight requirement pertains to the diol only and not to its derivatives. Aliphatic or cycloaliphatic diols with 2–15 carbon atoms are preferred, such as ethylene, propylene, tetramethylene, pentamethylene, 2,2dimethyltrimethylene, hexamethylene, and decamethylene glycols, dihydroxy cyclohexane and cyclohexane dimethanol.

The dicarboxylic acids or their derivatives and the polymeric glycol are incorporated into the copolyetherester in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of diol incorporated is still the difference between moles of diacid and polymeric glycol.

Epoxy-Functional Compounds

The epoxy compounds that are added to the copolyester elastomer to form the novel compositions of this invention can be monoepoxies or polyepoxies. The additive reacts with the carboxylic acid end groups on the copolyester elastomer and the acid terminated oligomers. When the copolyester elastomer is exposed to air containing amines, the reduction of acidity minimizes the amount of blooming on the surface of the polyether ester elastomer.

Representative useful monoepoxides include the monoglycidyl ethers of aliphatic or aromatic alcohols such as butyl glycidyl ether, octyl glycidyl ether, nonyl glycidyl ether, decyl glycidyl ether, dodecyl glycidyl ether, p-tert-butylphenyl glycidyl ether, and o-cresyl glycidyl ether. Monoepoxy esters such as the glycidyl ester of versatic acid, the glycidyl esters of other acids such as tertiary-nonanoic acid, tertiary-decanoic acid, tertiary-undecanoic acid, etc. are also useful. Similarly, if desired, unsaturated monoepoxy esters such as glycidyl acrylate, glycidyl methacrylate or glycidyl laurate could be used. Additionally, monoepoxidized oils can also be used.

Representative polyepoxides include those obtained by epoxidation include vinylcyclohexene diepoxide, bis(2,3-epoxycyclopentyl)ether, 3,4-epoxycyclohexylmethyl 3,4-epoxycyclohexane carboxylate, bis(3,4-epoxy-6-methylcyclohexylmethyl)adipate, 3-(3,4-epoxycyclohexane)-8,9-epoxy-dioxaspiro [5.5]-undecane, epoxidized butadiene and epoxidized natural oils. Other representative polyepoxides include those obtained by reaction of epichlorohydrin with polyhydric phenols include 4,4'-isopropylidene diphenol(bisphenol A), tetrabromobisphenol A, resorcinol, hydroquinone, pyrogullol, 4,4'-methylenebis(phenol) and polyphenols derived from phenol or cresol and an aldehyde (novolacs). Other suitable polyepoxides include reaction products of epichlorohydrin and aliphatic compounds containing two to six alcoholic hydroxyl groups such as ethylene glycol, butanediol-1,4, poly(alkylene oxide)glycols and triols, glycerol, 1,2,6-hexanetriol, pentaerythritol and sorbitol. Polyglycidyl esters of polycarboxylic acids such as adipic acid, succinic acid, phthalic acid and mellitic acid are also representative of suitable polyepoxides.

Optional Catalysts and Additives

Optionally, phosphonium compounds, alkali metal salts and alkaline earth metal salts of higher fatty acids are added to the copolyester elastomer and epoxide compounds. A catalytically effective amount is used, which is an amount sufficient to increase the rate of reaction between the epoxide and the carboxylic acid end groups on the copolyether elastomer and the acid terminated oligomers.

Examples of alkaline earth metal salts of higher fatty acids include calcium stearate, zinc stearate, magnesium behenate, magnesium stearate, sodium ricinoleate and potassium palmitate, antimony pyrocatecholate or tin pyrocatecholate. Examples of phosphonium compounds, such as phosphonium moieties, including monophosphonium compounds containing one cationic phosphonium moiety, diphosphonium compounds containing two cationic cationic phosphonium moieties and polyphosphonium compounds containing more than two cationic phosphonium moieties.

Other additives besides those that might have been added to the copolyester elastomer may also be added in the compounding step, including one or more stabilizers selected from anti-oxidants, anti-thermal decomposing agents and ultraviolet ray-absorbers; hydrolytic stabilizers; coloring materials (dyes and pigments); anti-static agents; fire-retardants; reinforcing materials, fillers; lubricants; nucleating agents; mold-release agents; plasticizers and processing aids; age resistors such as anti-ozonants; and adhesives, in an optional amount.

Preferred Embodiments

Preferred copolyetheresters for use in the compositions of this invention are those prepared from dimethyl terephthalate, 1,4-butanediol or ethylene glycol and poly(tetramethylene oxide)glycol having a number average molecular weight of about 600–2000 or ethylene oxide-capped poly(propylene oxide)glycol having a number average molecular weight of about 1500–2800 and an ethylene oxide content of 15–35% by weight. Optionally, up to about 30 mole percent of the dimethyl terephthalate in these polymers can be replaced by dimethyl phthalate or dimethyl isophthalate. The copolyetheresters prepared from 1,4-butanediol are especially preferred because of their rapid rates of crystallization.

A preferred polyepoxide is a di-glycidyl ester, such as Araldite CY-184 from Ciba-Geigy. A most preferred epoxide is a monomeric epoxide, a glycidyl ester which is commercially available, e.g., as Cardura™ E-10 from Shell Oil Company, Glydexx™ N-10 from Exxon, or Araldite™ PT910 from Ciba-Geigy. The epoxy compound is incorporated in the copolyetherester in an amount sufficient to obtain at least a 20% reduction in acidity of the copolyetherester, preferably in an amount of about 0.25 to about 5 weight percent, and most preferably in a range between 0.5 to about 2 weight percent.

Most preferred metal salt catalyst is a zinc stearate, available as Petrac™ Zn-41, Petrac Zn-42, from Synthetic Products Company. Most preferred phosphonium catalyst is tetrabutyl phosphonium bromide from Aldrich. Metal salt and/or phosphonium catalysts are optionally present in an amount up to 1 weight percent.

Preparation

The copolyetheresters used in this invention are made by a conventional ester interchange reaction. A preferred procedure involves heating the dimethyl ester of terephthalic acid with a long-chain glycol and a molar excess of 1,4-butanediol in the presence of a catalyst at about 150°–260° C. and a pressure of 0.05 to 0.5 MPa, usually ambient pressure, while distilling off methanol formed by the ester interchange. Depending on temperature, catalyst, glycol excess and equipment, this reaction can be completed within a few minutes, e.g., about two minutes, to a few hours, e.g., about two hours. This procedure results in the preparation of a low molecular weight prepolymer which can be carried to a high molecular weight copolyetherester by distillation of the excess of short-chain diol. The second process stage is known as "polycondensation."

Additional ester interchange occurs during this polycondensation which serves to increase the molecular weight and to randomize the arrangement of the copolyetherester units. Best results are usually obtained if this final distillation or polycondensation is run at less than about 670 Pa, preferably less than about 250 Pa, and about 200°–280° C., preferably about 220°–260° C., for less than about two hours, e.g., about 0.5 to 1.5 hours. It is customary to employ a catalyst while carrying out ester interchange reactions. While a wide variety of catalysts can be employed, organic titanates such as tetrabutyl titanate used alone or in combination with magnesium or calcium acetates are preferred. The catalyst should be present in the amount of about 0.005 to 2.0 percent by weight based on total reactants.

Both batch and continuous methods can be used for any stage of copolyetherester polymer preparation. Polycondensation of prepolymer can also be accomplished in the solid phase by heating divided solid prepolymer in a vacuum or in a stream of inert gas to remove liberated low molecular weight diol. This method has the advantage of reducing thermal degradation because it must be used at temperatures below the softening point of the prepolymer. Detailed descriptions of suitable copolyetherester elastomers that can be used in the invention and procedures for their preparation are described in U.S. Pat. Nos. 3,023,192, 3,651,014, 3,763,109, and 3,766,146.

The present compositions can be prepared by blending the epoxide compounds and the optional metal salt and/or phosphonium catalysts with the molten copolyester elastomer using any of the well-known techniques for preparing polymer blends or admixtures, with extrusion blending being preferred. Suitable blending devices include high shear mixing equipment such as screw-type extruders, twin screw extruders, internal mixers such as the Banbury mixer. Injection molding equipment can also be used to accomplish blending just prior to molding, but care must be taken to provide sufficient time and aggitation to insure uniform blending prior to molding. The blending temperatures will normally be about 20° C. above the melting point of the copolyester.

Alternative methods include dry blending prior to extrusion or injection molding as well as precompounding of the ingredients.

After blending, the elastomer compositions of the present invention may be injection molded, calendered, extruded and shaped into the desired elastormer products. The polymer compositions of the present invention are suitable for a broad range of molding applications, especially for automative applications as airbag doors.

EXAMPLES

Compositions were prepared according to the extrusion blending process described above, forming pellets. Pellets were dried and injection-molded into specimens for tests. In the Examples, and for physical testing values given herein, the following procedures were used:

Melt viscosities of dried specimens were determined at the noted temperature according to—ASTM D-638, using a Dynisco series 4000 Melt Indexer made by Kayeness, Inc.

Gloss Index: Specular gloss was measured in accordance with the procedure described in ASTM D523-89. Specifically, a "NOVO-GLOSS 60° GLOSSMETER" was used. An incident beam of light was directed at the surface of the specimen at an angle of 60° from perpendicular to the plane of the surface of the specimen. A receptor measured the reflected light at the corresponding 60° angle of reflectance. Several readings were taken and averaged.

The control and comparative examples are blends containing: a) an epoxide; b) optionally a catalyst; and c) a copolyester elastomer or a blend of copolyester elastomers from the following list:

"A": a copolyether ester elastomer composed of 45 wt. % 1,4 butylene terephthalate segments and 55 wt. % poly (tetramethylene ether) terephthalate segments with the poly (tetramethylene ether) glycol having a molecular weight of 1400.

"B": a copolyether ester elastomer composed of 38 wt. % 1,4 butylene terephthalate segments, 11 wt. % butylene isophthalate segments, 39.5 wt. % poly(tetramethylene ether) terephthalate segments, and 11.5 wt. % poly (tetramethylene ether) isophthalate segments with the poly (tetramethylene ether) glycol having a molecular weight of 1000.

"C": a copolyether ester elastomer composed of 23 wt. % 1,4 butylene terephthalate segments and 77 wt. % poly (tetramethylene ether) terephthalate segments with the poly (tetramethylene ether) glycol having a molecular weight of 2000.

"D": a copolyether ester elastomer blend composed of 25 wt. % carbon black dispersed in the copolyether ester elastomer "B," the blend was prepared in a manner similar to to the compounding procedures described above.

For the control example, a pellet blend was prepared by combining 73% (1460 g) by weight of of copolyether ester elastomer "A," 25% by weight (500 g) poly(butylene terephthalate), and 2% by weight (40 g) of copolyether ester elastomer "D." The blend was prepared according to the standard compounding procedures described above. The same copolyether ester blend was used for the other examples.

In examples 1–6, and 8–10 Cardura™E10 was compounded into the control example blend formulation. In example 7, Alraldite CY186 was used as the epoxide compound in the control example blend formulation. In example 11, butyl glycidyl ether was used as the epoxide in the control example blend formulation. In example 12, Cardura™E10 was compounded in a blend with 98% by weight of copolyether ester elastomer "C", and 2% by weight of copolyether ester elastomer "D".

In examples 1, 4–12, various catalysts were added including zinc stearate ("ZS"), zinc acetyl acetonate (ZnAcAc), tetrabutyl phosphonium bromide ("BuPBr"), zinc octoate (ZnOct), and tin (stannous) octoate (SnOct).

In all examples, the blend was thoroughly mixed by tumbling, then fed into the feed throat of a 28 mm twin screw extruder with a severe screw configuration (#4 screw) at a feed rate of 10.4 kg/hr. The extruder barrel temperatuere was maintained at about 240° C., and operated at a screw speed of 200 rpm. A vacuum was applied in a central zone of the extruder. The extrudate was quenched as a strand in a water trough, and pelletized. Melt index (as g/10 min. at 240° C.) and acidity level (meq/kg) were measured and recorded. The product was then dried at 90° C. overnight and injection-molded into plaques.

The plaques were measured for gloss and melt-index, then placed into a dessicator jar with some triethylene diamine crystals at the bottom of the jar. The samples were held there for 5 days. The plaques were removed from the jar and measured again for gloss-index. Appearance of the plaques were observed and recorded. For those plaques showing bloom after 5 days exposed to the amine-containing air, it was noted that rubbing the surface of the plaques removed the bloom and restored the plaques' original glossy appearance. It was also noted that a high concentration of catalysts contributed to the blooming in the presence of the diethylene diamine in spite of the reduction in acidity in the copolyether ester elastomer blend.

Table 1 lists additive concentrations as used in the examples, and the results before and after samples were exposed to amine-containing air.

TABLE 1

| Test No. | Epoxide wt. % | Catalyst wt. % | Melt Index | Acidity | Before Gloss | After Gloss | Bloom |
|---|---|---|---|---|---|---|---|
| Control | 0 | 0 | 19.3 | 41.5 | 87 | 70 | Y |
| 1 | 1 | 0.15 ZS | 23.8 | 12.4 | 85 | 84 | N |
| 2 | 1 | 0 | 22.6 | 25.1 | 84 | 80 | N |
| 3 | 2 | 0 | 42.2 | 10.0 | 85 | 85 | N |
| 4 | 1 | 0.3 ZS | 27.7 | 10.1 | 83 | 79 | Very Slight* |
| 5 | 1 | 0.3 BuPBr | — | 11 | 84 | 60 | Y* |
| 6 | 2 | 0.3 BuPBr | 62.4 | 0.9 | 85 | 72 | Slight* |
| 7 | 0.5 | 0.3 ZS | 8.1 | 25.0 | 87 | 82** | Very Slight* |
| 8 | 1.5 | 0.15 ZnAcAc | 36.7 | 0.2 | 84 | 83 | N |
| 9 | 1.5 | 0.28 SnOct | — | — | 83 | 80 | N |
| 10 | 1 | 0.22 ZnOct | — | — | 84 | 85** | N |
| 11 | 1 | 0.15 ZS | — | 29.5 | 86 | 82** | N |
| 12 | 1 | 0.15 ZS | — | — | 72 | 70 | N |

*Slight/very slight bloom is due to the presence of catalyst.
**Readings obtained after 7 days.

While forms of the invention has been illustrated and described, modifications can be made without departing from the spirit and scope of the invention. Accordingly, it is not intended that the invention be limited thereby.

What is claimed is:

1. A copolyether ester elastomer composition having improved bloom resistant property when exposed to air containing amines, said composition comprising:
    a) a copolyether ester composed of hard segments derived from at least one alkylene diol and at least one aromatic dicarboxylic acid, and soft segments derived from at least one polyalkylene oxide glycol and at least one aromatic dicarboxylic acid;
    b) an epoxide compound comprising at least one epoxide group in an amount sufficient for said epoxide compound to react with carboxylic acid end groups to obtain a reduction in acidity of at least 20%; and
    c) 0–1 weight percent of a catalyst selected from the group consisting of phosphonium compounds, alkali metal salts and alkaline earth metal salts;
    wherein the weight percents are based upon the total weight of component a).

2. The composition of claim 1, wherein said epoxide compound is present in an amount of about 0.25 to 5 weight percent.

3. The composition of claim 1, wherein said epoxide compound is present in an amount of about 0.5 to 2 weight percent.

4. The composition of claim 1, wherein said catalyst is an alkaline earth metal salt of higher fatty acids.

5. The composition of claim 4, wherein said catalyst is present in an amount of about 0.05 to 0.3 weight percent.

6. The composition of claim 1, wherein said catalyst is a phosphonium compound.

7. The composition of claim 1, wherein said epoxide is a monomeric epoxide.

8. The composition of claim 7, wherein said epoxide is a a glycidyl ester.

9. A molded article, comprising a component formed from the composition of claim 1.

10. An airbag cover of the composition of claim 1.

11. A method for reducing bloom appearance in copolyether ester elastomer compositions exposed to amine-containing air, said compositions composed of hard segments derived from at least one alkylene diol and at least one aromatic dicarboxylic acid, and soft segments derived from at least one polyalkylene oxide glycol and at least one aromatic dicarboxylic acid, by:
    a) blending into said composition an epoxide compound in an amount sufficient for said epoxide compound to react with carboxylic acid end groups to obtain a reduction in acidity of at least 20%; and
    b) optionally blending into said composition up to 1 weight percent of a catalyst selected from the group consisting of: phosphonium compounds, alkali metal salts and alkaline earth metal salts.

12. The method of claim 11, wherein said epoxide is a monomeric epoxide.

13. The method of claim 11, wherein said epoxide compound is present in an amount of about 0.25 to 5 weight percent.

14. The method of claim 11, wherein said catalyst is an alkaline earth metal salt of higher fatty acids.

* * * * *